United States Patent Office 3,054,781
Patented Sept. 18, 1962

3,054,781
THIOSULFATE PROCESS OF MAKING ORGANIC POLYSULFIDES
Kwan C. Tsou, Abington Township, Montgomery County, Pa., assignor to The Borden Company, New York, N.Y., a corporation of New Jersey
No Drawing. Filed Mar. 24, 1959, Ser. No. 801,449
7 Claims. (Cl. 260—79.1)

This invention relates to organic poly-polysulfides and to a process of preparing them.

The invention provides, for example, a polymer of xylylene polysulfide which has a softening point of around 250° C., as compared to only about 125° for the corresponding product from ethylene. It provides also a process of manufacture that gives polysulfides of the alkylenes, such as ethylene, that are substantially free of or greatly reduced in odor as compared to the commercial polysulfides now on the market. The invention comprises the herein described process and the new products obtained, particularly the said dithiosulfate intermediates and the new disulfides and polysulfides such as those of xylylene.

The process is illustrated by the reaction below, when ethylene dibromide and sodium thiosulfate are used as the original reactants and hydrogen peroxide at a pH below 7 as the condensing agent.

Br—CH$_2$CH$_2$—Br + 2Na$_2$S$_2$O$_3$ →
NaO$_3$S$_2$—CH$_2$—CH$_2$—S$_2$O$_3$Na + 2NaBr

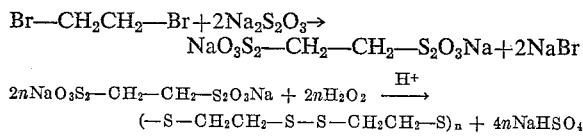

The $n$ is an integral number greater than 1.

The condensation, is considered to give initially an unstable radical having a sulfur on each side of the organic groups (here C$_2$H$_4$) previously combined with the thiosulfate. As a result of the instability, these radicals polymerize and, in so doing, form a compound having 2 sulfur atoms between each of the said groups originally joined to the two halogens.

In converting the disulfide polymer to the polysulfide polymer, by stirring in an additional atom of sulfur in elemental form for each combined sulfur, the "S" in each occurrence in the last formula above becomes S$_2$. The product so made is useful as a replacement for rubber.

In making the xylylene polysulfide, the group

CH$_2$—C$_6$H$_4$—CH$_2$ is substituted for CH$_2$—CH$_2$ in the equations above. Using the general formula X—R—X for the selected dihalide, the sequence of the steps in making the polydisulfide is shown briefly as follows:

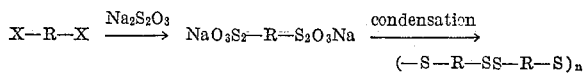

As starting material, there is used an organic dichloride or other dihalide. This is selected from the group consisting of compounds of the formula X—R—X in which R is a bivalent hydrocarbon group and X is any halogen. R contains suitably 1–10 carbon atoms, and the hydrocarbon group is either unsubstituted or substituted, as by oxygen (this term including hydroxy) and by any halogen, and is non-reactive with the thiosulfate under the conditions used, so that the R group remains in the final product. Examples of R are the C$_1$–C$_8$ alkylenes such as methylene, ethylene, propylenes, and butylenes and the C$_8$–C$_{10}$ arylenes. Specific examples of the dihalides are ethylene, o-, m-, or p-xylylene, and naphthylene dichlorides; di(chloroethyl)formal, di(chloroethyl)ether and dichloroglycerin; the corresponding fluorides, bromides, and iodides; and homologs and analogs thereof that are soluble in the selected solvent medium.

When it is desired to cross-link the final product or otherwise modify it, I can start with the trihalo instead of the dihalo compound, examples to be used being trichloropropane, trichlorobutane, dichloro - monofluoromethane, trichlorooctane, and alpha, alpha′, alpha″-trichloromesitylene.

In making sulfide or polysulfide copolymers, the dithiosulfate of the formula above is mixed with another of the same formula, except for replacement of R by R′, the formula then becoming NaO$_3$S$_2$—R′—S$_2$O$_3$Na, in which R′ is selected from the same group as R but is a different member of that group. Oxidation is effected and the oxidation product treated with elemental sulfur to give the copolymer poly-polysulfide all as described herein for the homo-polymers.

As the thiosulfate, I use either anhydrous or hydrated sodium thiosulfate. In place of the sodium salt, I can use the corresponding salt of other metals such as potassium, lithium or ammonium, all these thiosulfates being soluble in water and in the solvent medium that I select.

As the solvent medium for the selected organic chloride and the thiosulfate, I use to advantage mixtures of water and a water soluble organic liquid that is chemically inert and with the said chloride and thiosulfate, in proportion to give the whole solvent medium dissolving power for both the organic chloride and the inorganic thiosulfate. The preferred organic liquid is a monohydric C$_1$–C$_4$ alcohol. I can use, in place of this alcohol, a water soluble polyhydric alcohol, such as ethylene or propylene glycol or glycerin, also acetone, diacetone alcohol, and methylethylketone. Other solvents that may be used are dimethyl formamide and dimethylacetamide. Each of these organic materials may be used alone or mixed with another of them and always with water in amount, if any, required to make appreciably soluble therein not only the selected organic halide but also the inorganic thiosulfate. Solvent media so selected or mixed are non-solvents for the organic poly-disulfides in the amounts obtained, i.e., poor solvents.

For condensing the intermediate or first stage product, i.e., the organic dithiosulfate, I introduce a compound of the general formula R′OOH in which R′ represents hydrogen, a C$_1$–C$_8$ alkyl, an aryl, such as phenyl, benzyl, and xylenyl; and aliphatic, or aromatic acyl groups, examples being benzoyl, acetyl, and butyryl. The agent may also be nitrous acid in association with a tract of iodine as catalyst, alkali metal and ammonium persalts, as for example, the persulfates, and elemental oxygen dispersed as such in the solution or as air, the condensing by oxygen suitably being accelerated by ferrous ion in the solution, as in the form of the sulfate or other soluble salt.

The condensing with the peroxide and with the other agents proceeds at a satisfactory rate when an acid is admixed in amount to establish the pH below 7 as within the range 1–4 and, for best results 2–3. The acid used is one that, in the amount used is substantially nonreactive with the organic radical R. Economical examples are ordinarily sulphuric, phosphoric, and nitrophosphoric acids.

A suitable proportion of water in the solvent medium is 1 part for 0.2–5 and ordinarily 0.5–2 of the organic liquid solvent.

Stoichiometric amounts of the selected halide X—R—X and of the thiosulfate to react therewith are suitable. This means 2 moles of the thiosulfate for 1 mole of the organic dihalide originally used.

For the condensing stage, I react one atom of available oxygen (from 1H$_2$O$_2$ for instance) for each thiosulfate radical in the intermediate product first made.

Variations from such proportions are permissible although it is economical to use sufficient of each reactant to consume the other, particularly to use all of the more costly component.

As to conditions of operation, I keep the reacting materials in intimate contact with each other and in dispersion in the solvent medium, that is, either dissolved or very finely dispersed. Temperatures may be room to refluxing for the first two reactions. Elevated temperatures accelerate the reaction. Both the first reaction and the oxidation step are exothermic and cooling is effected, as required, to keep the mixture from boiling too violently as under a reflux condenser or in a vessel preventing loss by volatilization. These steps in each instance are continued until the exotherm which first appears practically ceases as shown by lack of further substantial heat evolution. In the first reaction, the product formed, namely the di(monosodium thiosulfate) remains dissolved in the solvent medium. In the condensing step, the resulting organic poly-disulfide ordinarily precipitates so that it is separable and is in fact separated by settling or filtration or both, the term "filtration" including centrifuging.

In reacting the admixed elemental sulfur, to make the poly-polysulfide, the sulfur and poly-disulfide compound are heated to the temperature of melting (or solution) of the sulfur in contact with the disulfide but below the temperature of vaporization of either component of the mixture, as a 100°–225° C. and normally about 130°–200° C.

When it is desired to make a copolymer of different disulfides, then the intermediate product, the thiosulfate, from one dihalide is mixed in controlled amount with the thiosulfate from another of the dihalides, conveniently while each is still dissolved in the aqueous solvent medium, so that in the subsequent oxidation a copolymer involving two or more different R's is formed.

The invention will be further illustrated by description in connection with the following specific examples of the practice of it. In these examples and elsewhere herein proportions are expressed as parts by weight unless specifically stated to the contrary.

EXAMPLE 1

*Sodium Salt of Xylylene Dithiosulfate*

Sodium thiosulfate in amount corresponding to 63.2 parts on the anhydrous basis (approximately 0.4 mole) was dissolved in a mixture of 200 parts of water and 30 parts of ethanol. Into this there was stirred 35 parts of alpha,alpha'-dichloroxylylene (2.2 mole), the xylylene being para. The mixture was allowed to come to reflux and was then cooled as required to avoid violent boiling. when the exothermic reaction had been substantially completed as shown by subsidence of the refluxing and dropping of the temperature, the product so formed was the intermediate sodium salt of dithiosulfate of xylylene

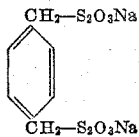

The di(monosodiumthiosulfate) so formed remains dissolved. It may be recovered in solid form by evaporating the solution.

The thiosulfate group, it is considered, is predominantly or wholly in the form of the monosodium salt

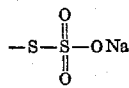

EXAMPLE 2

*Xylylene Polysulfide*

The solution of the xylylene dithiosulfate made as the final product of Example 1 and being in solution was cooled to 0° C. and acidified with 0.5 part, more or less, of concentrated sulphuric acid which was stirred in slowly in amount to establish a pH of about 2.

Next there was introduced, gradually and with stirring, 51.5 parts of aqueous hydrogen peroxide solution of peroxide concentration 35% (1 mole of $H_2O_2$). The mixture was allowed to rise slowly to approximately room temperature, at which point an exothermic reaction appeared. This reaction caused the mixture to reflux vigorously and a white precipitate to settle, the boiling being moderated with cooling until the refluxing ceased and the temperature began to fall. The white precipitate was filtered, washed with a small proportion of water and then dried at a moderately elevated temperature below the melting point of any solid material present. The precipitate was xylylene poly-disulfide which may be written as

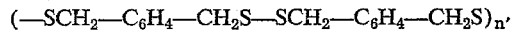

This product is insoluble in all common organic solvents such as alcohol, acetone, benzene, chloroform, dimethyl formamide and dimethyl acetamide.

This product was then mixed dry with elemental sulfur in the proportion of 1 atom to each atom of combined sulfur. The mix was warmed until the whole fused and until no further substantial change in consistency occurred and the added sulfur was combined, as at 160° to 180° C. The sulfurs in the formula above are now united severally to an additional sulfur, thus

The product is now xylylene poly-polysulfide, a tough rubbery material.

EXAMPLE 3

*Sodium Salt of Ethylene Dithiosulfate*

Sodium thiosulfate, in the amount of 99.2 parts of the anhydrous material (0.62 mole), was dissolved in 200 parts of water. To this solution was added with stirring a solution of 37.6 parts of ethylene dibromide $$Br-CH_2-CH_2-Br$$

(0.2 mole), in 33 parts of ethanol.

The mixture was allowed to reflux until homogeneous, was then cooled to 0° C. and condensed and then treated with additional sulfur in the manner described in Example 1.

The resulting polymer of ethylene polysulfide had very little odor.

EXAMPLE 4

*Polybis (Beta,Beta'-Diethyl Ether) Disulfide*

To 63.2 parts of sodium thiosulfate in 200 parts of water were added 40 parts ethanol and 28.6 parts of bis(beta,beta'-dichloroethyl) ether. This mixture was refluxed until homogeneous. After refluxing, it was cooled to room temperature and acidified by stirring in 20 parts of 20% sulfuric acid. To this solution was then added slowly 44 parts of 35% hydrogen peroxide. The reaction was strongly exothermic and a viscous oil separated. The oil (20 parts) collected by separation was

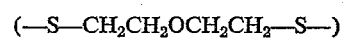

This poly-disulfide, reacted with elemental sulfur as above, produced a tarry, rubbery material which is the poly-polysulfide of diethyl ether.

EXAMPLE 5

*Copolymers of Polyxylylene and Polyethylene Disulfide*

Equimolecular proportions of the sodium salt of xylylene dithiosulfate and the sodium salt of ethylene dithiosulfate, prepared as in Examples 1 and 3, respectively, are mixed together and the mixture condensed in the same manner as above, by 35% hydrogen peroxide after acidification. A white precipitate was collected. The structure of the resulting mixed disulfide is:

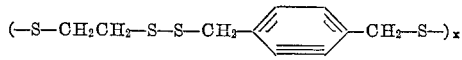

When this disulfide copolymer is heated with sulfur in amount providing 1 elemental S for each combined S, the poly-polysulfide is formed. It is a tan colored, rubbery material.

EXAMPLE 6

*Use of Other Dihalides*

The procedure and composition of Examples 1–3 are used except that the halogen represented in the dihalide there used is replaced in turn by each of the other halogens disclosed herein, in equivalent proportion.

EXAMPLE 7

The procedure and composition of any one of Examples 2–4 are used with the substitution of each of the other condensing agents, disclosed herein, in turn for the hydrogen peroxide, in equivalent amount based on oxidizing capacity.

The disulfides made as described are useful in making the said poly compounds containing the grouping

and the latter as rubber substitutes, as in coating and adhesive compositions. The poly compounds have less odor than like products made by the usual process.

It is to be understood that it is intended to cover all changes and modifications of the examples of the invention herein chosen for the purposes of illustration which do not constitute departures from the spirit and scope of the invention.

I claim:

1. In making an organic poly-polysulfide the process which comprises subjecting the organic thiosulfate product of reaction of a thiosulfate selected from the group consisting of lithium, sodium, potassium and ammonium thiosulfates in aqueous solution with a dihalide of the formula X—R—X to the action of a condensing agent at a pH below 7 and a temperature not above the boiling point of the solution until the reaction is substantially completed, mixing the resulting product with elemental sulfur, and then melting the said mixture, X in the formula representing an atom of a halogen and R a component selected from the group consisting of $C_1$–$C_8$ alkylene radicals, $C_8$–$C_{10}$ bivalent aromatic hydrocarbon radicals and oxy and halogen substitution products of the said radicals, the condensing agent being selected from the group consisting of compounds of the formula R'OOH in which R' is selected from the class consisting of hydrogen, $C_1$–$C_8$ alkyl, aryl radicals, aliphatic acyl and aromatic acyl radicals, mixed nitrous acid and iodine, alkali metal and ammonium persulfates, elemental oxygen, and elemental oxygen in contact with ferrous ion and the said condensing agent being used in proportion providing about 1 atom of available oxygen for each thiosulfate radical in the said organic thiosulfate.

2. The process of claim 1 in which R is an alkylene group containing 1–8 carbon atoms.

3. The process of claim 1 in which R is the xylene group.

4. The process of claim 1 in which the said halogen is chlorine.

5. The process of claim 1, the condensing agent being elemental oxygen.

6. Xylene di(mono-alkali-metal thiosulfate) of the formula $$MeO_3S_2—CH_2—C_6H_4—CH_2—S_2O_3Me$$

Me being an alkali metal.

7. In making an organic poly-polysulfide the process which comprises subjecting the organic thiosulfate product of reaction of a thiosulfate selected from the group consisting of lithium, sodium, potassium and ammonium thiosulfates in aqueous solution with a dihalide of the formula X—R—X to the action of a condensing agent at a pH below 7 and a temperature not above the boiling point of the solution until the reaction is substantially completed, mixing the resulting product with elemental sulfur, and then melting the said mixture, X in the formula representing an atom of a halogen and R a component selected from the group consisting of $C_1$–$C_8$ alkylene radicals, $C_8$–$C_{10}$ bivalent aromatic hydrocarbon radicals and oxy and halogen substitution products of the said radicals, the condensing agent being hydrogen peroxide and the proportion thereof used being about 1 mole of the peroxide for each thiosulfate radical in the said organic thiosulfate.

References Cited in the file of this patent

UNITED STATES PATENTS

| | | |
|---|---|---|
| 2,278,127 | Patrick | Mar. 31, 1942 |
| 2,418,938 | Izard | Apr. 15, 1947 |
| 2,676,165 | Fettes | Apr. 20, 1954 |
| 2,875,182 | Fettes et al. | Feb. 24, 1959 |
| 2,925,372 | Fettes et al. | Feb. 16, 1960 |